Dec. 16, 1952     A. E. WAETERLING     2,621,585
EGG TIMING DEVICE
Filed Sept. 1, 1948     2 SHEETS—SHEET 1

INVENTOR.
ARTHUR E. WAETERLING
BY Samuel Stree
ATTORNEY

Dec. 16, 1952   A. E. WAETERLING   2,621,585
EGG TIMING DEVICE

Filed Sept. 1, 1948   2 SHEETS—SHEET 2

INVENTOR.
ARTHUR E. WAETERLING
BY Samuel J Stree
ATTORNEY

Patented Dec. 16, 1952

2,621,585

UNITED STATES PATENT OFFICE 2,621,585

EGG TIMING DEVICE

Arthur E. Waeterling, Long Island City, N. Y.

Application September 1, 1948, Serial No. 47,313

1 Claim. (Cl. 99—336)

This invention relates to a timing mechanism for controlling the cooking time of eggs and other foods and food products.

Egg timing devices have heretofore been devised and patented. The more perfected of these devices include a timing mechanism and means controlled thereby for removing the eggs from the boiling water in the pot in which they are cooked, at the appropriate time, say at the end of a one minute or a two minute or a three minute time interval. In these egg timing devices, removal of the eggs from the boiling water consists simply in elevating the eggs above the water level. The water however continues to boil and to emit steam. It is evident therefore that what happens to the eggs is that they are removed from one cooking medium, to wit, the boiling water, and they are placed under the influence of another cooking medium, to wit, a steam bath. This is tantamount to removing the eggs from the frying pan and tossing them into the fire since the cooking operation continues long after they are removed from the pot in which the timed cooking operation takes place.

In the present invention cognizance has been taken of the fact that a steam bath cooks eggs and other foods equally as well or at least equally as effectively as boiling water. In the present invention a timing mechanism is provided which controls and actuates a mechanism that not only removes the eggs from the boiling water in which they are cooked but also removes them from the influence of the steam which emanates from the boiling water. When the device herein claimed removes the eggs from the boiling water at the end of the timed interval, the cooking process actually comes to a complete end, which is decidedly not the case with egg timing devices heretofore devised and patented.

It is accordingly the principal object of this invention to provide an egg timing device of the character described which removes the eggs from the boiling water in which they are cooked, at the end of a selected time interval, and also removes the eggs from the influence of the steam which the boiling water emanates.

It is a corollary object of this invention to provide an egg timing device of the character described which, at the conclusion of the cooking operation, removes the eggs from the heating medium which cooks them and places the eggs under the influence of a cooling medium for reducing the temperature of the eggs and more especially of the egg shells to a point where the eggs may comfortably be handled.

It is still another object of this invention to provide an egg timing device of the character described which may be used commercially in restaurants and similar food establishments as well as in the private home where the device may very readily and removably be attached to an ordinary pot in which eggs are customarily cooked.

A preferred form of this invention is shown, by way of illustration and not of limitation, in the accompanying drawing in which:

Fig. 1 is a back view of the preferred form of this invention, its casing being open to expose the operative parts of its mechanism;

Fig. 2 is a side view thereof, the casing being partly broken away to expose its said mechanism;

Fig. 3 is a sectional view showing the trigger mechanism which holds the egg holder in operative position for a given period of time and then releases it for movement to inoperative position;

Figure 4:
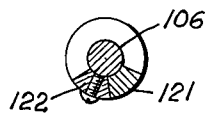
Fig. 4 is a cross-sectional view through the clutch members of the mechanism of said invention.

The egg timing device shown in the drawing includes a casing 100 having a pair of brackets 99 affixed thereto for mounting the egg timing device on the side wall of an ordinary cooking utensil 98 containing boiling water 97. Mounted in the casing is a conventional clockwork mechanism 101 which actuates a lever 102. At the conclusion of a selected time interval, the clockwork mechanism swings lever 102 upwardly. An arm 103 connected to said clockwork mechanism determines the length or duration of the time interval.

Attached to lever 102 is a rod 104 which is connected to arm 105, said arm 105 being freely mounted on shaft 106. Arm 105 is positioned for engagement with trigger 107. This trigger is connected by means of a link 108 to a pin 109, said pin being journaled in the arms of bracket 110 and being urged leftwardly, as seen in Fig. 3, by means of compression spring 111 which is disposed between one of the arms of the bracket and a collar 112 which is fastened to said pin.

Crank handle 115 is connected to shaft 106 in the manner shown in Fig. 1. Actuation of said crank handle 115 has the effect of winding the clockwork mechanism 101 for the work which it is to do. This is accomplished through the instrumentality of an arm 116 which is fixedly mounted on shaft 106 and which engages a pin 117 on arm 105 when shaft 106 is caused to engage in angular movement by actuation of the crank handle.

When the crank handle is actuated it also accomplishes another result, that is, it causes the egg holder 120 to pivot into operative position relative to the boiling water in the pot. The means by which this result is achieved is best shown in Fig. 1. It includes a gear wheel 121 which is freely rotatable on shaft 106 and which is engaged by a clutch 122 that is fixedly mounted on said shaft. See Fig. 4 for the interaction between clutch 122 and gear wheel 121. Actually each of these two members is provided with a shoulder which is positioned for engagement with the shoulder of the other member. Gear wheel 121 which is of the mitered or beveled type engages a similar gear wheel 125 mounted at the lower end of a shaft 126. At the upper end of said shaft is still another beveled gear wheel 127 which engages a last gear wheel of this type 128 fixedly mounted on shaft 129. A bracket 130 and a plate 131 fastened respectively to the back and top walls 133 and 134 of the casing, serve as bearings for shaft 126 which extends at right angles with respect to shafts 106 and 129. Shaft 129 is supported by means of brackets 135 and 136 respectively which are fastened to the top wall 134 of the casing. Egg holder 120 is fastened by means of pins 140 to shaft 129 so that said egg holder and said shaft may move integrally with each other.

Figure 5:
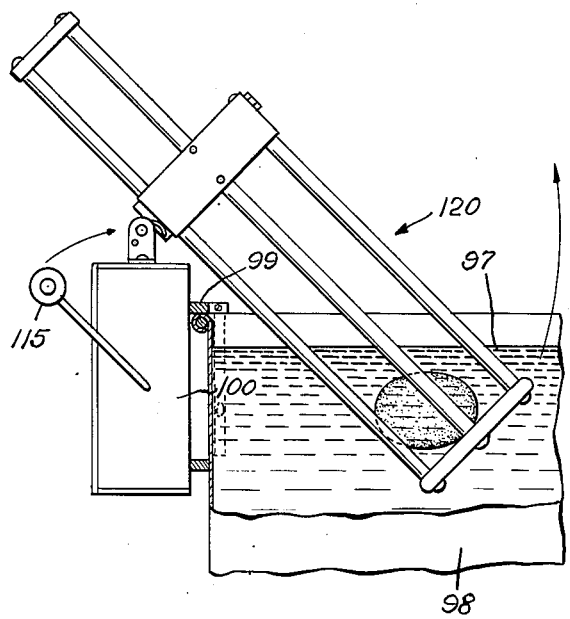
Fig. 5 is a side view of the entire device which constitutes this form of the invention, showing the egg holder in operative position, and showing by means of a curved arrow, the direction of movement of said egg holder from its said operative position to its inoperative position.
Figure 6:
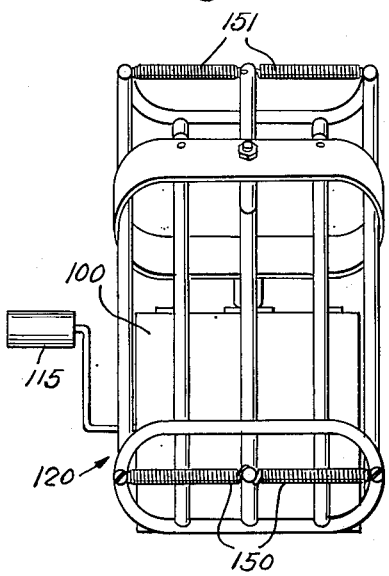
Fig. 6 is a front perspective view of the egg holder, showing it in operative position.

It is evident from the foregoing that when crank handle 115 is actuated to wind the clockwork mechanism it also has the effect of causing the egg holder to engage in pivotal movement with shaft 129. A coil spring 141 is mounted on shaft 129 for engagement with supporting bracket 136. The action of this spring is upon shaft 129, and hence upon egg holder 120, to urge said shaft and said egg holder to pivot in counter-clockwise direction, as seen in Fig. 5, to remove the eggs from the pot of boiling water. Hence, when crank arm 115 is actuated to pivot the egg holder in clockwise direction in order to bring it into operative position relative to the boiling water in the pot, the action of spring 141 is opposed and said spring is placed under increased tension or torque.

The trigger mechanism shown in Fig. 3 prevents the egg holder from pivoting in counter-clockwise direction until compelled to do so at the conclusion of a selected time interval, by the clockwork mechanism acting through arm 105. It will be noted that a collar 145 is affixed to shaft 126. This collar has a hole 146 formed therein, radially thereof. The position of said hole in said collar is such as to bring the hole into registration with pin 109 when collar 145 engages in angular movement with shaft 126. As soon as registration between the hole and the pin is effected, the pin, urged by spring 111, will enter the hole and prevent further angular movement of the collar and hence of the shaft to which it is fixed. Since the shaft is geared to shaft 129 which supports the egg holder 120, further angular movement of said shaft 129 and hence of the egg holder is also prevented. When lever 102 swings upwardly in response to the action of the clockwork mechanism thereon, it brings arm 105 into engagement with trigger 107 and causes said trigger to pull pin 109 out of hole 146, thereby freeing collar 145, shaft 126, shaft 129 and egg holder 120 for pivotal movement in response to the action of loaded spring 141 upon said egg holder. The egg holder is thereby pivoted in counter-clockwise direction, as seen in Fig. 5, into inoperative position.

Egg holder 120 not only holds the eggs in operative and inoperative position but it also serves as a chute for the eggs enabling them to travel from operative to inoperative position when it is tilted from its operative to its inoperative position. Hence egg holder 120 is provided with the shape of a chute and with spring bumpers 150 and 151 at its respective ends. These spring bumpers enable the eggs to slide from one position to the other without cracking.

The foregoing is descriptive of a preferred form of this invention and this form may be modified in different ways in accordance with individual requirements within the broad scope of the invention. Although the invention has been described in terms of its application to the cooking of eggs it will be understood that it may very easily be adapted for application to the cooking or preparation of other foods equally as well.

I claim:

An egg timing device of the character described, comprising an egg holder pivotally mounted on the side of a pot suitable for cooking eggs, manually operable means including a crank handle for pivoting said egg holder into operative position in said pot, a spring motor connected to said egg holder for pivoting it into inoperative position outside of the pot, a latch connected to said egg holder for holding it in operative position in said pot against the action of the spring motor, a trigger mechanism which is engageable with said latch for disengaging the latch from the egg holder to enable said egg holder to pivot into inoperative position in response to the action of the spring motor thereon, and a clockwise mechanism connected to said trigger mechanism for actuating the same at the conclusion of a given time interval, said egg holder comprising a pivotally supported chute with spring bumpers at both ends, said chute being pivotable into operative position thereby enabling the eggs contained therein to slide into operative position, said chute being pivotable into inoperative position, thereby enabling the eggs contained therein to slide into inoperative position.

ARTHUR E. WAETERLING.

REFERENCES CITED

The following references are of record in the file of this patent:

UNITED STATES PATENTS

| Number | Name | Date |
| --- | --- | --- |
| 551,274 | Fundinger et al. | Dec. 10, 1895 |
| 816,072 | Chesbrough | Mar. 27, 1906 |
| 867,921 | Martin | Oct. 8, 1907 |
| 879,057 | Leclere | Feb. 11, 1908 |
| 949,764 | Hammerstein | Feb. 22, 1910 |
| 1,118,471 | Carlton | Nov. 24, 1914 |
| 1,433,501 | Donges | Oct. 24, 1922 |
| 1,931,345 | Fitzgerald | Oct. 17, 1933 |
| 2,196,968 | Bemis | Apr. 16, 1940 |

FOREIGN PATENTS

| Number | Country | Date |
| --- | --- | --- |
| 382,149 | Germany | Sept. 29, 1923 |